(12) United States Patent
Aotani et al.

(10) Patent No.: US 9,620,291 B2
(45) Date of Patent: Apr. 11, 2017

(54) THIN FILM CAPACITOR (71) Applicant: TDK CORPORATION, Tokyo (JP)

(72) Inventors: Junji Aotani, Tokyo (JP); Shigeaki Tanaka, Tokyo (JP); Katsuyuki Kurachi, Tokyo (JP); Tatsuo Namikawa, Tokyo (JP); Yuuki Aburakawa, Tokyo (JP)

(73) Assignee: TDK CORPORATION, Tokyo (JP)

( * ) Notice: Subject to any disclaimer, the term of this patent is extended or adjusted under 35 U.S.C. 154(b) by 13 days.

(21) Appl. No.: 14/799,247

(22) Filed: Jul. 14, 2015

(65) Prior Publication Data

US 2016/0020030 A1 Jan. 21, 2016

(30) Foreign Application Priority Data

Jul. 16, 2014 (JP) ................. 2014-145779

(51) Int. Cl.
| | |
|---|---|
| *H01G 4/30* | (2006.01) |
| *H01G 4/33* | (2006.01) |
| *H01G 4/012* | (2006.01) |
| *H01G 4/01* | (2006.01) |
| *H01G 4/015* | (2006.01) |
| *H01G 4/12* | (2006.01) |

(52) U.S. Cl.
CPC ............. *H01G 4/33* (2013.01); *H01G 4/01* (2013.01); *H01G 4/012* (2013.01); *H01G 4/015* (2013.01); *H01G 4/12* (2013.01)

(58) Field of Classification Search
CPC ................................. H01G 4/306; H01G 4/30
USPC .............................................. 361/301.4, 311
See application file for complete search history.

(56) References Cited

U.S. PATENT DOCUMENTS

| | | | |
|---|---|---|---|
| 4,464,823 A | 8/1984 | Izu et al. | |
| 4,510,674 A | 4/1985 | Izu et al. | |
| 4,510,675 A | 4/1985 | Izu et al. | |
| 5,587,614 A | 12/1996 | Hwang et al. | |
| 5,854,499 A | 12/1998 | Nishioka | |
| 5,923,062 A | 7/1999 | Ohno | |
| 5,936,257 A | 8/1999 | Kusunoki et al. | |
| 5,970,337 A | 10/1999 | Nishioka | |

(Continued)

FOREIGN PATENT DOCUMENTS

| | | |
|---|---|---|
| JP | S61-64112 A | 4/1986 |
| JP | H06-112081 | 4/1994 |
| JP | H08-78283 A | 3/1996 |
| JP | H10-27729 A | 1/1998 |
| JP | 2000-178793 A | 6/2000 |

(Continued)

OTHER PUBLICATIONS

Shimizu, Shigeo et al., "Technology for the Detection and Repair of Micro-Defects Occuring in Transparent Thin-Film on LCD Panels", NTN Technical Review, No. 68, May 2000, pp. 81-85.

*Primary Examiner* — Eric Thomas
(74) *Attorney, Agent, or Firm* — Oliff PLC (57) ABSTRACT

A thin film capacitor including a lower electrode layer, a dielectric layer provided on the lower electrode layer, and an upper electrode layer formed on the dielectric layer, wherein the dielectric layer includes a recessed portion in a portion on the upper face thereof, a cross-sectional structure perpendicular to the dielectric layer of the recessed portion has a cross-sectional taper angle of 1 degree or more and 25 degrees or less, and the distance between the bottom portion center and an outermost portion of the recessed portion is 20 times or more and 150 times or less a thickness of the dielectric layer.

2 Claims, 4 Drawing Sheets (56) References Cited

U.S. PATENT DOCUMENTS

| | | | |
|---|---|---|---|
| 6,132,585 A | 10/2000 | Midorikawa et al. | |
| 6,166,424 A | 12/2000 | Mikawa et al. | |
| 6,207,522 B1 | 3/2001 | Hunt et al. | |
| 6,270,835 B1 | 8/2001 | Hunt et al. | |
| 6,288,890 B1 | 9/2001 | Saito et al. | |
| 6,433,993 B1 | 8/2002 | Hunt et al. | |
| 6,728,092 B2 | 4/2004 | Hunt et al. | |
| 6,751,833 B2 | 6/2004 | Saito et al. | |
| 7,319,081 B2 | 1/2008 | Sakashita et al. | |
| 7,524,552 B2 | 4/2009 | Yokota et al. | |
| 7,592,626 B2 | 9/2009 | Ozaki et al. | |
| 2003/0235944 A1* | 12/2003 | Okita | H01L 21/31122 438/206 |
| 2004/0183147 A1 | 9/2004 | Togashi et al. | |
| 2007/0057300 A1* | 3/2007 | Fukada | H01L 27/11502 257/295 |

FOREIGN PATENT DOCUMENTS

| | | |
|---|---|---|
| JP | 2001-356367 A | 12/2001 |
| JP | 2002-026266 A | 1/2002 |
| JP | 2002-043517 A | 2/2002 |
| JP | 2002-110468 A | 4/2002 |
| JP | 2002-185148 A | 6/2002 |
| JP | 2002-231574 A | 8/2002 |
| JP | 2003-011270 A | 1/2003 |
| JP | 2004-335963 A | 11/2004 |
| JP | 2005-101348 A | 4/2005 |
| JP | 2007-247612 A | 9/2007 |
| JP | 2008-160040 A | 7/2008 |
| JP | 2012-099529 A | 5/2012 |

\* cited by examiner

THIN FILM CAPACITOR

TECHNICAL FIELD

The present invention relates to a thin film capacitor.

BACKGROUND

In recent years, in various electronic devices, spaces for installing electronic components have tended to be reduced. Thus, capacitors have a demand for a reduction in profile. For the reduction of capacitors in profile, it is effective to reduce the thicknesses of dielectric layers. As capacitors having dielectric layers being small in thickness, capacitors in which dielectric layers are formed using thin film forming techniques such as sputtering method are known (hereafter, referred to as thin film capacitors) (refer to Patent Literature 1). A thin film capacitor described in Patent Literature 1 includes a first electrode layer, a dielectric layer, and a second electrode layer, which are laminated and formed on a base substrate in this order.

Conventional thin film capacitors have a problem in that a defect occurs in a dielectric layer as the thickness of the dielectric layer is made small, which causes a fault due to short circuit, increases a leakage current, and decreases a withstanding voltage. A defect in a dielectric layer here refers to a foreign object existing on the dielectric layer or inside the dielectric layer, or a part that shows a structure different from a normal structure of the dielectric layer, such as a crack or a pinhole of the dielectric layer.

Patent Literature 1 describes the idea that the raised problem of the occurrence of a short-circuit failure, the increase in a leakage current, and the decrease in a withstanding voltage is attributed to a pinhole portion or a grain boundary existing in a dielectric layer. Patent Literature 1 discloses, as means to solve this problem, a technique in which a material constituting the first electrode layer is oxidized between a pinhole portion or a grain boundary in the dielectric layer and the first electrode layer to form an insulating layer.

Patent Literature 2 discloses a technique to repair a broken portion in an insulating layer or the like in a multi-layered circuit board, which is formed by laminating the insulating layer or a low dielectric layer on a conductor pattern of a lower layer and laminating a conductor pattern of an upper layer on this insulating layer or the like. In this technique, after the formation of the insulating layer or the like, an insulating material such as an epoxy resin is caused to be attached to a broken portion in the insulating layer or the like, using an electrodeposition method in which the conductor pattern of the lower layer is used as one electrode.

Patent Literature 3 discloses a production method in which a resin insulator is formed in a pinhole portion or the like in a dielectric layer, using an electrophoresis.

Non Patent Literature 1 discloses a technique in which an electrically continuous defective portion is burned off by laser irradiation and brought into an OPEN state, and the defect is thereby substantially repaired.

CITATION LIST

Patent Literature

Patent Literature 1: Japanese Patent Laid-Open No. 2002-26266
Patent Literature 2: Japanese Patent Laid-Open No. 2002-185148
Patent Literature 3: Japanese Patent Laid-Open No. 2008-160040

Non Patent Literature

Non Patent Literature 1: NTN TECHNICAL REVIEW No. 68 (2000), p81

SUMMARY

As disclosed by the inventors of Patent Literatures 1 to 3, there are known techniques in which a defect in a dielectric layer is repaired or removed by some methods to enhance a withstanding voltage performance. However, the present inventors have found that defect repair cannot be sufficiently performed on thin film capacitors even when such techniques are employed.

For example, if the outermost portion of a repaired portion has a steep cross-sectional taper angle, or if the distance between the end portion of the repaired portion and the end portion of a defect has to be shortened, electric charge accumulated in the repaired portion unfortunately transmits through the interface between an electrode and a dielectric layer, reaching the defect, which decreases the withstanding voltage of the thin film capacitor. In addition, also in the case where electrically continuous defective portion is burned off by laser irradiation and brought into an OPEN state, there has been a case where electric charge is transmitted at the end portion of a processed portion.

The present invention is made in view of the above-described finding and has an object to provide a thin film capacitor in which a short-circuit failure is prevented to enhance a withstanding voltage performance.

A thin film capacitor for solving the above-described problems includes a lower electrode layer, a dielectric layer provided on the lower electrode layer, and an upper electrode layer provided on the dielectric layer. On the upper electrode layer side of the dielectric layer in the thin film capacitor, a recessed portion is formed. Inside this recessed portion, a defect may exist. In addition, the cross-sectional structure perpendicular to the dielectric layer of the recessed portion has an angle formed by (1) tangential line that is tangent to a position on an end portion of the recessed portion and at 50% of a maximum depth of the recessed portion (the depth of the recessed portion measured from a line showing the interface between an upper electrode and the dielectric layer), and (2) a line being an interface obtained by averaging minute projections and depressions on the upper face of the dielectric layer in an area without a recessed portion, with respect to a distance equivalent to the size of the recessed portion (hereafter, this is referred to as a cross-sectional taper angle.), the gentle cross-sectional angle being 1 degree or more and 25 degrees or less. Note that the end portion of the recessed portion refers to the boundary line of the recessed portion in the above-described cross-sectional structure. By making the thin film capacitor having this structure, it is possible to obtain an effect of suppressing short circuit (dielectric breakdown) in the dielectric layer. Although the causes of this effect is not clearly known, the present inventors consider that there are two causes: (1) the formation of the recessed portion on the dielectric layer causes a portion where the leakage of electric charge is likely to occur (the bottom portion of the recessed portion) to be formed, and electric charge generated there is consumed while moving in the interface between the upper electrode layer and the dielectric layer in the direction toward the outermost portion of the recessed portion; and (2)

since the end portion of the recessed portion has a gentle shape, electric field concentration hardly occurs. In addition, on the upper electrode layer, a projecting portion corresponding to the shape of the recessed portion in the dielectric layer may be formed toward the direction of the dielectric layer. The present inventors expected an abrupt movement of electric charge due to such a projecting portion, but such a phenomenon could not be found. Although the cause of this is not clear, there is a conceivable possibility that a Schottky barrier is formed between the projecting portion on the upper electrode layer and the dielectric layer, which allows the electric charge generated in the bottom portion of the recessed portion to easily move in the direction of the interface between the dielectric layer and the upper electrode layer, rather than the direction of the projecting portion of the upper electrode layer. As a result of this effect, it is possible, according to an embodiment of the invention of the application, to prevent a short-circuit failure in a thin film capacitor and to secure properties such as a sufficient capacitance.

In the surface of the dielectric layer, the shortest distance between the bottom portion center of the recessed portion and the outermost portion of the recessed portion is from 20 times or more to 150 times or less the thickness of the dielectric layer. Furthermore, it is preferable in particular that this shortest distance is from 40 times or more to 80 times or less the thickness of the dielectric layer. The bottom portion center of the recessed portion described here refers to a center on the surface of the dielectric layer in the recessed portion formed on the dielectric layer. The bottom portion center can be calculated as a geometric center the recessed portion as viewed in plan in a direction perpendicular to the dielectric layer. Note that if the shape of the recessed portion as viewed in plan is not a circle, the above-described center is assumed to refer to the center of gravity of the shape viewed in plan. Electric charge accumulated in the outermost portion of the recessed portion may move in a thickness direction of the dielectric layer (having an electric resistance value R1) and in the direction of the interface (having an electric resistance value R2). The present inventors considered these electric resistance values through simulations and experiments. The relationship between the resistance values R1 and R2 has variations depending on the kinds of material of the dielectric layer, but the resistance value R1 was about 150 times higher than R2. If the shortest distance between the bottom portion center of the recessed portion and the outermost portion of the recessed portion (hereafter, this distance is denoted by $L_{min}$.) exceeds 150 times the thickness of the dielectric layer, the probability of generating short circuit or a leakage current in a thin film capacitor is increased. As the cause of this, it can be considered that electric charge accumulated in the outline of the recessed portion tends to flow in a thickness direction of the dielectric layer that has a relatively low electric resistance. In other words, it is considered that the short circuit occurs when electric charge once accumulated in the end portion existing in the outline of the recessed portion is not dispersed appropriately, and the charge is released locally. The outline described here refers to the outer circumference of the recessed portion when the recessed portion is viewed in plan in a direction perpendicular to the dielectric layer. In addition, also if $L_{min}$ is below 20 times the thickness of the dielectric layer, the probability of generating short circuit or a leakage current in a thin film capacitor is increased. As the cause of this, it can be considered that charge consumption in a planar direction is not sufficient, and dielectric breakdown occurs. Such a recessed portion can be formed by performing laser processing with properly controlled output, on a dielectric layer.

In the bottom portion of the recessed portion on the dielectric layer, a portion where the dielectric layer is the thinnest is formed. The thickness of this thinnest portion can be made 60% or more and 90% or less of the thickness of the dielectric layer other than the recessed portion. By controlling the thickness of the thinnest portion in the dielectric layer within this range, the withstanding voltage property thereof can be further enhanced. If the thickness of the thinnest portion is below 60%, the amount of charge transfer in the thickness direction of the dielectric layer in the thinnest portion in the dielectric layer may become larger than necessary depending on a condition for the material or the like of the dielectric layer or the upper electrode layer. On the other hand, if the thickness of the thinnest portion is over 90%, a distance of charge transfer in the interface between the upper electrode layer and the dielectric layer may be insufficient.

According to the present invention, it is possible to provide a thin film capacitor in which short-circuit failure is prevented, and the withstanding voltage performance thereof is enhanced.

DETAILED DESCRIPTION

Hereafter, a preferred embodiment of the present invention will be described with reference to the accompanying drawings. Note that identical or equivalent elements will be denoted by the same reference symbols and the description thereof will be omitted if it is redundant.

Figure 1:
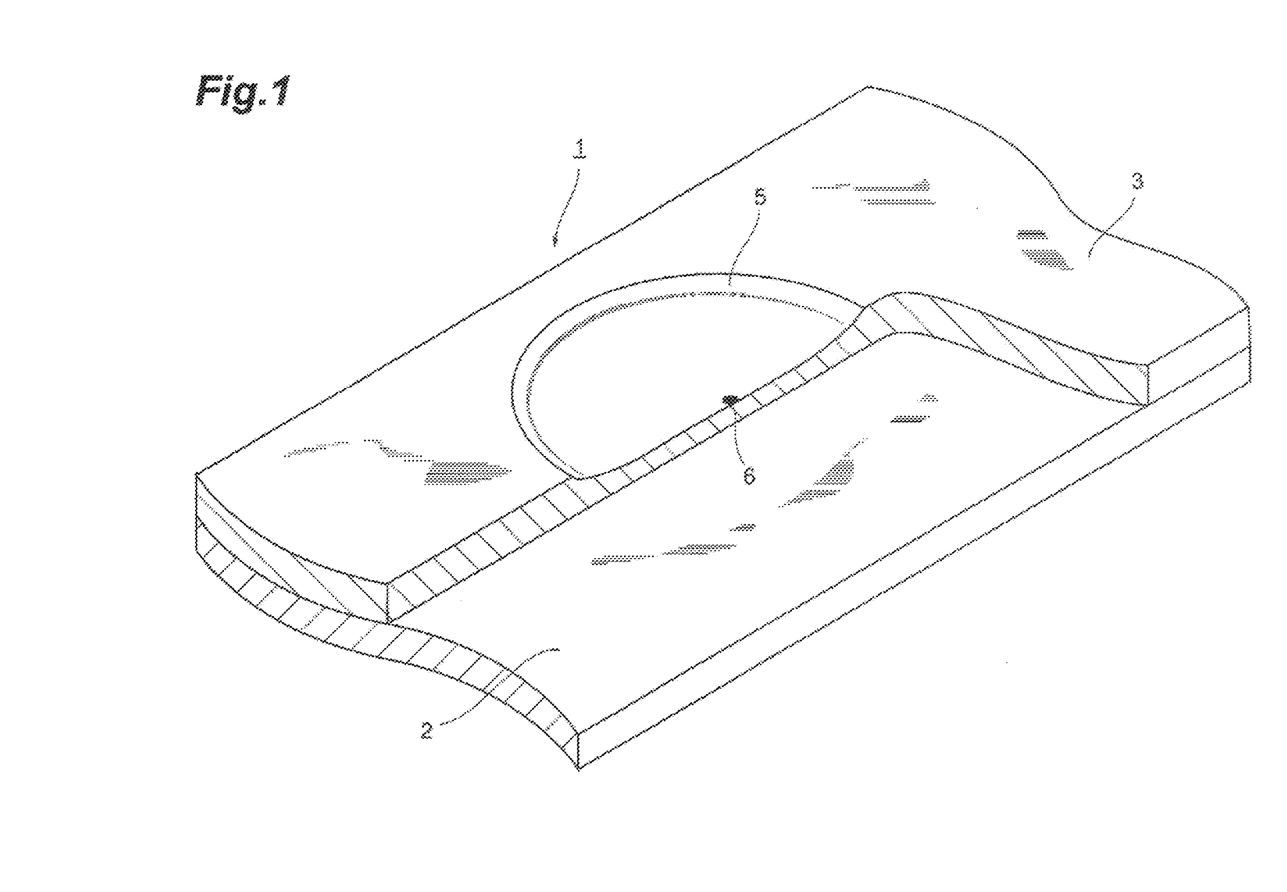
FIG. 1 is a perspective cross sectional view schematically showing a thin film capacitor in one embodiment of the present invention.

FIG. 1 is a cross sectional view of a thin film capacitor in the present embodiment. A thin film capacitor 1 is constituted with a lower electrode layer 2, a dielectric layer 3 provided on the lower electrode layer 2, and an upper electrode layer 4 provided on the dielectric layer 3.

As the material of the lower electrode layer 2 in the present embodiment, well-known conductive materials can be selected as appropriate. The well-known conductive materials refer to, for example, metals, metallic oxides, conductive organic materials, and the like. In particular, the lower electrode 2 preferably has a low electric resistance and a high mechanical strength, and thus metallic materials are preferably used therefor. Above all, Ni or Cu is preferable because they are relatively sturdy metallic materials having low electric resistances. In particular, in terms of the viewpoint of high-temperature load reliability and moisture-proof load reliability, the lower electrode 2 is preferably a conductive body containing at least a Ni. The conductive body containing Ni mentioned here refers to a pure Ni (99.9% or more of Ni) or a Ni-based alloy. In the case of a Ni-based alloy, a noble metal element such as Pt, Pd, Ir, Ru, and Rh is preferably contained, and the content thereof is preferably 50 mass % or less. Within such a range of content, it is possible to obtain the high-temperature load reliability and the moisture-proof load reliability of the thin film capacitor 1 equivalent to the case of using a pure Ni.

The form of the lower electrode layer 2 in the present embodiment can be selected from various forms such as a conductivity foil containing a metal, a sintered body containing a metal, a conductive thin film formed on a substrate of any kind, or the like. In particular, the lower electrode layer 2 is preferably a Ni foil consisting of a metal polycrystal. By making the lower electrode layer 2 into a metallic foil, it is possible to reduce the difference in thermal expansion coefficient from the dielectric layer 3 and to suppress the reduction of capacitance of the thin film capacitor 1. As the lower electrode layer 2, for example, an electrode layer obtained by forming a conductive thin film of a Ni electrode layer or the like on a Si substrate or a ceramic substrate (not shown) by sputtering, vapor deposition, or the like may be used. In the case of such a form, as the substrate, a material of a thermal expansion coefficient having a small difference from that of the dielectric layer 3 is desirably used. As such an electrode, for example, a Si substrate with a Ni film, a ceramic substrate with a Ni film, or the like can be used. It is thereby possible to suppress the reduction of the capacitance of the thin film capacitor 1 due to the difference in thermal expansion coefficient.

Furthermore, the form of the lower electrode layer 2 in the present embodiment may be one in which a different conductive material is interposed between the lower electrode layer 2 and the dielectric layer 3. Alternatively, the lower electrode layer 2 may have a multi-layered electrode structure. The multi-layered electrode structure can be a multi-layered electrode structure in which a Ni electrode layer is disposed on the side of a surface facing the dielectric layer 3. Such a multi-layered electrode structure may have, for example, a structure in which a Ni electrode layer is provided on a Cu foil by sputtering, vapor deposition, or the like. Note that, in the case where the Ni electrode layer is in contact with the dielectric layer 3, the high-temperature load reliability and the moisture-proof load reliability of the thin film capacitor 1 are further enhanced.

The material of the dielectric layer 3 in the present embodiment is preferably a perovskite oxide dielectric, which has a high relative permittivity. Of perovskite dielectrics, a $BaTiO_3$-based dielectric without a lead is preferable in terms of environmental preservation viewpoint. In the case of a $BaTiO_3$-based dielectric, a $BaTiO_3$-based dielectric in which a part of a Ba site is substituted with an alkaline earth such as Ca and Sr may be used. In addition, a $BaTiO_3$-based dielectric in which a part of Ti site is substituted with an element such as Zr, Sn, and Hf may be used. Furthermore, a rare-earth element or Mn, V, Nb, Ta, or the like may be added to the dielectric.

For the formation of the dielectric layer 3 in the present embodiment, a method typically used in thin film formation, for example, the application of a solution, sputtering, vapor deposition, PLD (Pulse Laser Deposition), CVD, or the like can be used as appropriate.

The structure of the dielectric layer 3 in the present embodiment is preferably a thin film having a film thickness of 1000 nm or less. A thin film having a thickness more than 1000 nm has a risk of reducing a capacitance value per unit area. In addition, there is no lower limit in particular on the film thickness, but an insulation resistance value becomes smaller as the thickness becomes small. For this reason, the film thickness of the dielectric layer 3 is preferably 50 nm or more. In view of the above relationship between the insulation resistance value and the capacitance, it is considered that a preferable range of the film thickness of the dielectric layer 3 in the thin film capacitor 1 is from 250 nm to 1000 nm. Dote that the dielectric layer 3 in the present embodiment may include a defect that is stochastically difficult to be avoided.

Figure 2:
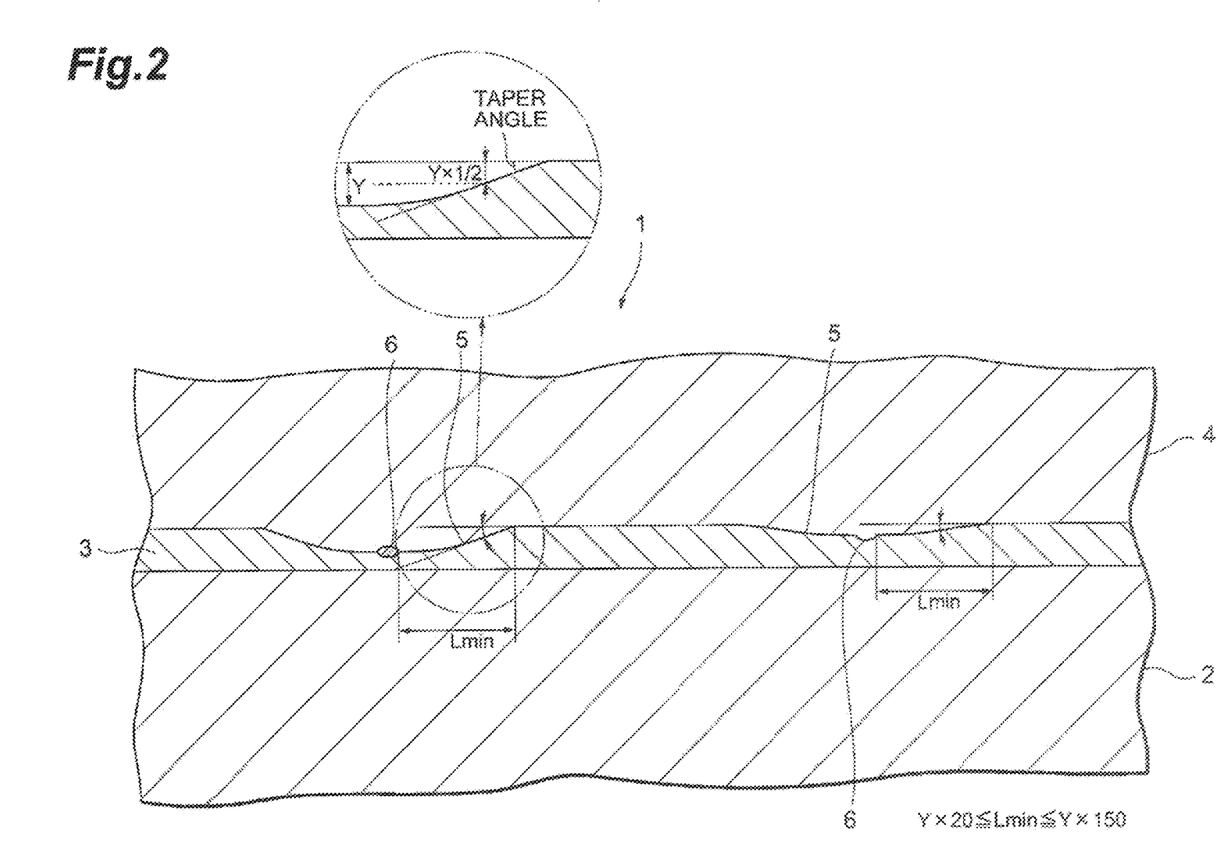
FIG. 2 is a schematic cross sectional view schematically showing the thin film capacitor in one embodiment of the present invention.

In the present embodiment, a recessed portion 5 is formed after the dielectric layer 3 is formed. The recessed portion 5 can be provided in any location in the dielectric layer 3. For example, the recessed portion 5 may be provided in a defective portion of the dielectric layer 3. The determination of a defect in that case can be made by, for example, capturing a surface image of the dielectric layer 3 with a camera and performing pattern recognition on a shape that is characteristic of defects. Alternatively, a defect may be electrically determined as a leakage location of electric charge.

Figure 4:
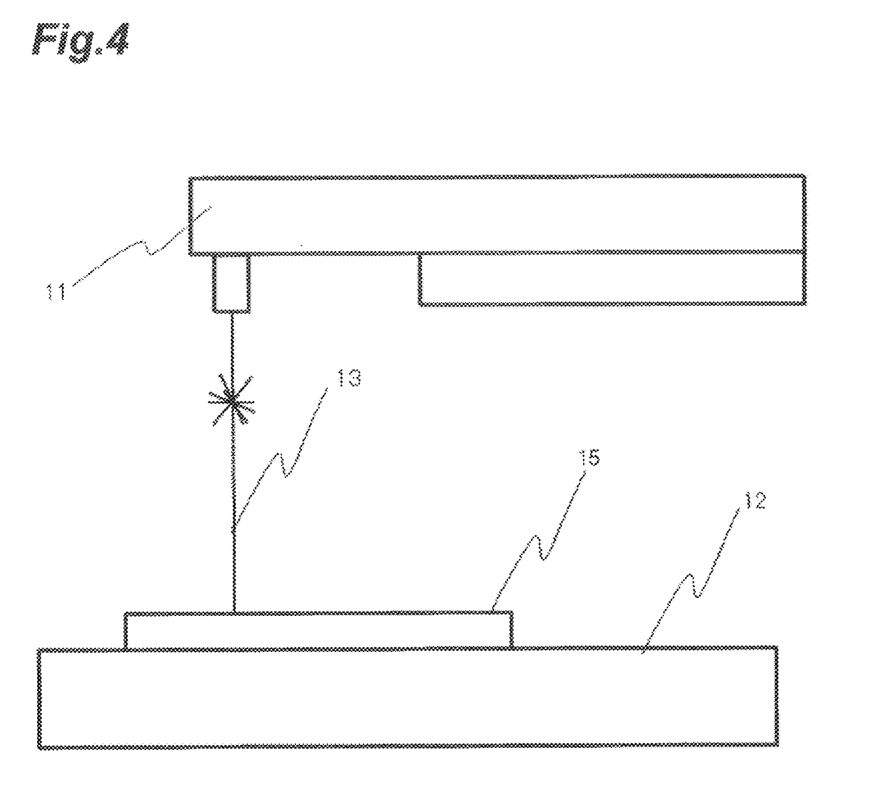
FIG. 4 is a schematic diagram of a laser device used for the formation of the recessed portion in one embodiment of the present invention.

For the formation of the recessed portion 5 on the dielectric layer 3, methods such as laser irradiation and chemical or electrical etching can be used. Above all, the formation the recessed portion 5 by laser irradiation allows position controllability to be easily achieved. The laser is preferably a pulse laser in terms of output power. For example, a laser having a wavelength of 1064 nm or 532 nm of a YAG laser, a $CO_2$ laser, or the like can be used as appropriate. The pulse width of the laser can be made within a range from picoseconds to nanoseconds. In the dielectric layer 3 having been subjected to pulse laser irradiation, the dielectric layer 3 is deeply shaved off in proximity to an irradiated position, and the amount of shaving in the dielectric layer 3 becomes small as being outward from the center in the irradiated position. As a result, the recessed portion 5 is formed into a round shape the end portion of which has a gentle taper shape. At this point, the laser irradiation is desirably performed in such a manner as to adjust the output of the laser to form the recessed portion 5 with a gentle cross-sectional taper shape. If a desired shape cannot be produced only by performing output adjustment while the laser-irradiated position is fixed, the laser irradiation may be performed while the surface of the dielectric layer 3 is subjected to minute scanning. For example, as shown in FIG. 4, the recessed portion 5 is formed by disposing, on the stage 12, a layered body 15 in which the dielectric layer 3 is formed on the lower electrode layer 2 and irradiating the dielectric layer 3 with a laser beam 13 from a laser device 11.

Figure 3:
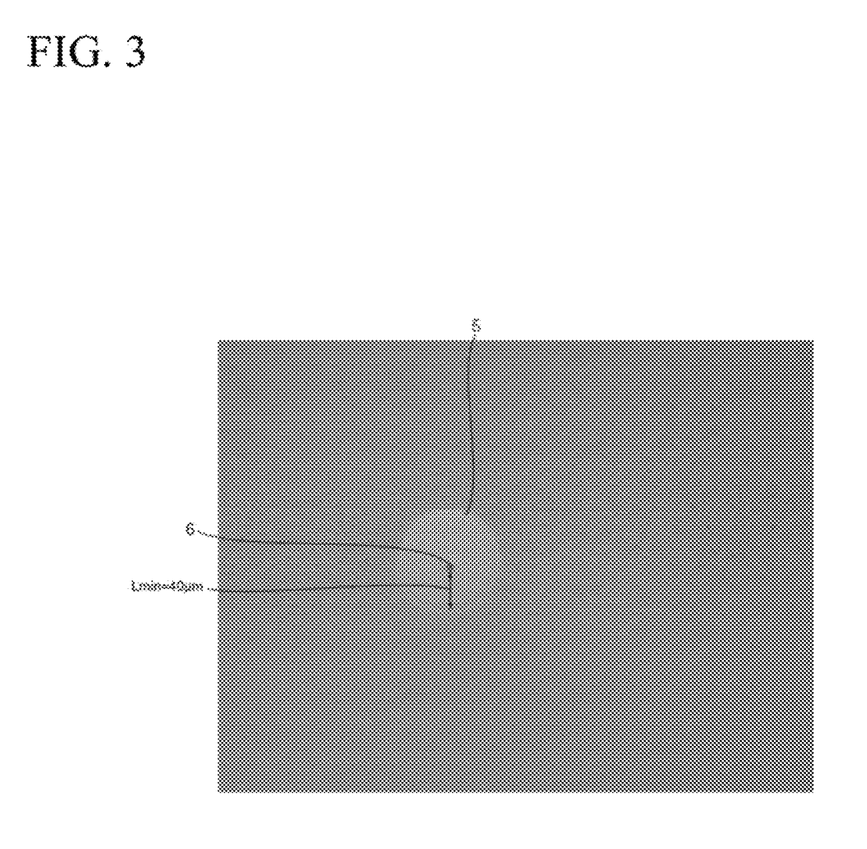
FIG. 3 is an observation image of a recessed portion in one embodiment of the present invention with an optical microscope.

FIG. 3 is an observation image of the recessed portion 5 in the present embodiment taken by an optical microscope. In the observation image, a bottom portion center 6 of the recessed portion 5 is clearly discerned. In this observation example, $L_{min}$ measures 40 µm. In addition, after the laser irradiation, the dielectric layer near the recessed portion 5 is to be rapidly cooled, and thus it is estimated that a nearby crystalline state is changed to amorphous. It is considered that, with such a change in crystalline state, the electric property of the dielectric layer is also changed, resulting in an increased resistance in a cross-sectional direction, which in turn allows a good property against leakage to be obtained. In addition, a droplet of a dielectric material (that refers to a dielectric material once melted and thereafter solidified into a granular shape.) may be generated with laser irradiation, a situation is conceivable where the droplet functions as an obstacle that controls leakage current in the direction of an interface.

In the thin film capacitor 1 in the present embodiment, the upper electrode layer 4 is formed after the recessed portion 5 is formed. As the material of the upper electrode layer 4 in the present embodiment, well-known conductive materials can be selected as appropriate. The well-known conductive materials refer to, for example, metals, metallic oxides, conductive organic materials, and the like, which can be selected as appropriate. In particular, the upper electrode layer 4 preferably has a low electric resistance and a high mechanical strength. For this reason, it is preferable to use metals. Above all, Ni or Cu is preferable because they are relatively sturdy metallic materials having low electric resistances. The upper electrode layer 4 may be a single layer consisting of a Ni electrode layer or a Cu electrode layer, and may be a double-layer structure consisting of a Ni electrode layer and a Cu electrode layer. Between the upper electrode layer 4 and the dielectric layer 3 or the insulation structure 5, a different conductive material may be interposed. In the case where the upper electrode layer 4 contains a Ni electrode layer, it is desirable, in terms of reliability, that the Ni electrode layer side is in contact with the dielectric layer 3. In the case of using a Ni electrode layer for the whole or a part of the upper electrode layer 4, a pure Ni or a Ni based alloy can be used as with the lower electrode layer 1. In the case of a Ni-based alloy, for example, the Ni-based alloy desirably contains a noble metal element such as Pt, Pd, Ir, Ru, and Rh, and the content thereof is desirably 50 mass % or less. Furthermore, the thickness thereof is preferably within a range from 0.1 μm and 2.0 μm.

On the Ni electrode layer in the present embodiment, a Cu electrode layer may be formed. The Cu electrode layer described herein is preferably a pure Cu (99.9% or more of Cu), or a Cu-based alloy. In the case of an alloy, for example, it is desirable that the alloy desirably contains a noble metal element such as Pt, Pd, Ir, Ru, and Rh, and the content thereof is desirably 50 mass % or less. Cu has a feature that it has a resistivity equivalent to that of Au or Ag and is convenient for industrial use. For this reason, Cu is used for lines in electronic devices in many cases. In addition, using Cu for electrode layers of thin film capacitors has an effect of reducing an equivalent series resistance (ESR) due to its relatively small resistivity.

For the formation of the upper electrode layer 4, a method typically used in thin film formation, for example, the application of solution, sputtering, vapor deposition, PLD (Pulse Laser Deposition), CVD or the like can be used as appropriate.

A preferred embodiment of the present invention has been described above, but the present invention is not limited to the above-described embodiment.

EXAMPLES

Hereinafter, the present invention will be specifically described by way of examples. Note that the present invention is not limited to the following examples.

Example 1

A dielectric layer (BaTiO$_3$-based dielectric) was formed by a sputtering method with a thickness of 800 nm on a Ni foil having a size of 100 mm×100 mm. The dielectric layer was thereafter annealed, and the dielectric layer on the Ni foil was thereby crystallized.

The dielectric layer was processed using a YAG laser with nanosecond pulses of a wavelength of 532 nm, having a power of 800 mJ and a spot diameter of 30 μm, such that the shortest distance between the outermost portion of a recessed portion and the bottom portion center of the recessed portion was made 17.6 μm (22 times the thickness of the dielectric layer thickness). The cross-sectional taper angle of the end portion thereof was 18 degrees and the dielectric layer thickness of the recessed portion was 640 nm (80% of the thickness of a portion other than the recessed portion of the dielectric layer (normal portion)). Thereafter, a Ni and a Cu were formed into films by a sputtering method in this order, as an upper electrode layer.

After the formation of the upper electrode layer, patterning was performed on the upper electrode layer, annealing was performed in a vacuum at 340° C. This annealing was performed for particle growth of the Cu electrode layer. For 100 capacitor elements having a size of 5 mm×5 mm that were subjected to the patterning, the measurements of capacitance values and insulation resistance values shown below were performed.

The capacitance values were measured at 1 kHz, 1 Vrms, and a room temperature (25° C.), using LCR Meter 4284A made by Agilent. The insulation resistance values were measured at 4 VDC, and a room temperature (25° C.), using High-Resistance Meter 4339B made by Agilent.

The results showed that conforming items were obtained, having capacitance values of $2.5 \times 10^{-7}$ F or more and insulation resistance values of $5 \times 10^{+8} \Omega$ or more at 91% (91/100 pcs) of measured number of articles.

Example 2

The fabrication and the measurement were performed as with Example 1 except that a dielectric layer were subjected to laser processing with a power of 700 mJ and a spot diameter of 50 μm such that the shortest distance between the outermost portion of the recessed portion and the bottom portion center of the recessed portion was 32 μm (40 times the dielectric layer thickness). In the result, a cross-sectional taper angle was 18 degrees and a dielectric layer thickness of the recessed portion was 584 nm (at 73% of portion other than the recessed portion). The results showed that conforming items were obtained, having capacitance values of $2.5 \times 10^{-7}$ F or more and insulation resistance values of $5 \times 10^{+8} \Omega$ or more at 93% (93/100 pcs) measured number of articles.

Example 3

The fabrication and the measurement were performed as with Example 1 except that the dielectric layer was subjected to laser processing with a power of 700 mJ and a spot diameter of 100 μm such that the shortest distance between the outermost portion of the recessed portion and the bottom portion center of the recessed portion was 56 μm (70 times the dielectric layer thickness). In the result, a cross-sectional taper angle was 18 degrees and a dielectric layer thickness of the recessed portion was 544 nm (at 68% portion other than the recessed portion). The results showed that conforming items were obtained, having capacitance values of $2.5 \times 10^{-7}$ F or more and insulation resistance values of $5 \times 10^{+8} \Omega$ or more at 97% (97/100 pcs) of measured number of articles.

Example 4

The fabrication and the measurement were performed as with Example 1 except that the dielectric layer was subjected to laser processing with a power of 700 mJ and a spot diameter of 130 μm such that the shortest distance between the outermost portion of the recessed portion and the bottom portion center of the recessed portion was 80 μm (100 times the dielectric layer thickness). In the result, a cross-sectional taper angle was 18 degrees and a dielectric layer thickness was the recessed portion of 520 nm (at 65% of portion other than recessed portion). The results showed that conforming items were obtained, having capacitance values of $2.5 \times 10^{-7}$ F or more and insulation resistance values of $5 \times 10^{+8} \Omega$ or more at 99% (99/100 pcs) of measured number of articles.

Example 5

The fabrication and the measurement were performed as with Example 1 except that the dielectric layer was subjected to laser processing with a power of 700 mJ and a spot diameter of 150 μm such that the shortest distance between the outermost portion of the recessed portion and the bottom portion center of the recessed portion was 104 μm (130 times the dielectric layer thickness). In the result, a cross-sectional taper angle was 18 degrees and a dielectric layer thickness was the recessed portion of 480 nm (at 60% of portion other than the recessed portion). The results showed that conforming items were obtained, having capacitance values of $2.5 \times 10^{-7}$ F or more and insulation resistance values of $5 \times 10^{+8}$ Ω or more at 98% (98/100 pcs) of measured number of articles.

Example 6

The fabrication and the measurement were performed as with Example 1 except that the dielectric layer was subjected to laser processing with a power of 400 mJ and a spot diameter of 200 μm such that the shortest distance between the outermost portion of the recessed portion and the bottom portion center of the recessed portion was 120 μm (150 times the dielectric layer thickness). In the result, a cross-sectional taper angle was 10 degrees and a dielectric layer thickness was the recessed portion of 512 nm (at 64% of portion other than the recessed portion). The results showed that conforming items were obtained, having capacitance values of $2.5 \times 10^{-7}$ F or more and insulation resistance values of $5 \times 10^{+8}$ Ω or more at 94% (94/100 pcs) of measured number of articles.

Example 7

The fabrication and the measurement were performed as with Example 1 except that the dielectric layer was subjected to laser processing with a power of 100 mJ and a spot diameter of 200 μm such that the shortest distance between the outermost portion of the recessed portion and the bottom portion center of the recessed portion was 120 μm (150 times the dielectric layer thickness). In the result, a cross-sectional taper angle was 2 degrees and a dielectric layer thickness was the recessed portion of 680 nm (at 85% of portion other than the recessed portion). The results showed that conforming items were obtained, having capacitance values of $2.5 \times 10^{-7}$ F or more and insulation resistance values of $5 \times 10^{+8}$ Ω or more at 90% (90/100 pcs) of measured number of articles.

Example 8

The fabrication and the measurement were performed as with Example 1 except that the dielectric layer was subjected to laser processing with a power of 300 mJ and a spot diameter of 100 μm such that the shortest distance between the outermost portion of the recessed portion and the bottom portion center of the recessed portion was 64 μm (80 times the dielectric layer thickness). In the result, a cross-sectional taper angle was 12 degrees and a dielectric layer thickness was the recessed portion of 480 nm (at 60% of portion other than the recessed portion). The results showed that conforming items were obtained, having capacitance values of $2.5 \times 10^{-7}$ F or more and insulation resistance values of $5 \times 10^{+8}$ Ω or more at 93% (93/100 pcs) of measured number of articles.

Example 9

The fabrication and the measurement were performed as with Example 1 except that the dielectric layer was subjected to laser processing with a power of 250 mJ and a spot diameter of 100 μm such that the shortest distance between the outermost portion of the recessed portion and the bottom portion center of the recessed portion was 64 μm (80 times the dielectric layer thickness). In the result, a cross-sectional taper angle was 7 degrees and a dielectric layer thickness was the recessed portion of 616 nm (at 77% of portion other than the recessed portion). The results showed that conforming items were obtained, having capacitance values of $2.5 \times 10^{-7}$ F or more and insulation resistance values of $5 \times 10^{+8}$ Ω or more at 85% (85/100 pcs) of measured number of articles.

Example 10

The fabrication and the measurement were performed as with Example 1 except that the dielectric layer was subjected to laser processing with a power of 100 mJ and a spot diameter of 100 μm such that the shortest distance between the outermost portion of the recessed portion and the bottom portion center of the recessed portion was 64 μm (80 times the dielectric layer thickness). In the result, a cross-sectional taper angle was 3 degrees and a dielectric layer thickness of the recessed portion was 720 nm (at 90% portion of other than the recessed portion). The results showed that conforming items were obtained, having capacitance values of $2.5 \times 10^{-7}$ F or more and insulation resistance values of $5 \times 10^{+8}$ Ω or more at 83% (83/100 pcs) of measured number of articles.

Example 11

The fabrication and the measurement were performed as with Example 1 except that the dielectric layer was subjected to laser processing with a power of 400 mJ and a spot diameter of 30 μm such that the shortest distance between the outermost portion of the recessed portion and the bottom portion center of the recessed portion was 20 μm (25 times the dielectric layer thickness). In the result, a cross-sectional taper angle was 10 degrees and a dielectric layer thickness of the recessed portion was 480 nm (at 60% of portion other than the recessed portion). The results showed that conforming items were obtained, having capacitance values of $2.5 \times 10^{-7}$ F or more and insulation resistance values of $5 \times 10^{+8}$ Ω or more at 81% (81/100 pcs) of measured number of articles.

Example 12

The fabrication and the measurement were performed as with Example 1 except that the dielectric layer was subjected to laser processing with a power of 100 mJ and a spot diameter of 30 μm such that the shortest distance between the outermost portion of the recessed portion and the bottom portion center of the recessed portion was 20 μm (25 times the dielectric layer thickness). In the result, a cross-sectional taper angle was 4 degrees and a dielectric layer thickness of the recessed portion was 720 nm (at 90% of portion other than the recessed portion). The results showed that conforming items were obtained, having capacitance values of $2.5 \times 10^{-7}$ F or more and insulation resistance values of $5 \times 10^{+8}$ Ω or more at 80% (80/100 pcs) of measured number of articles.

Example 13

The fabrication and the measurement were performed as with Example 1 except that the dielectric layer was subjected to laser processing with a power of 600 mJ and a spot diameter of 200 μm such that the shortest distance between the outermost portion of the recessed portion and the bottom portion center of the recessed portion was 120 μm (150 times the dielectric layer thickness). In the result, a cross-sectional taper angle was 15 degrees and a dielectric layer thickness of the recessed portion was 400 nm (at 50% of portion other than the recessed portion). The results showed that conforming items were obtained, having capacitance values $2.5 \times 10^{-7}$ F or more and insulation resistance values of $5 \times 10^{+8} \Omega$ or more at 71% (71/100 pcs) of measured number of articles.

Example 14

The fabrication and the measurement were performed as with Example 1 except that the dielectric layer was subjected to laser processing with a power of 700 mJ and a spot diameter of 200 μm such that the shortest distance between the outermost portion of the recessed portion and the bottom portion center of the recessed portion was 120 μm (150 times the dielectric layer thickness). In the result, a cross-sectional taper angle was 18 degrees and a dielectric layer thickness of the recessed portion was 360 nm (at 45% of portion other than the recessed portion). The results showed that conforming items were obtained, having capacitance values of $2.5 \times 10^{-7}$ F or more and insulation resistance values of $5 \times 10^{+8} \Omega$ or more at 68% (68/100 pcs) of measured number of articles.

Example 15

The fabrication and the measurement were performed as with Example 1 except that the dielectric layer was subjected to laser processing with a power of 80 mJ and a spot diameter of 40 μm such that the shortest distance between the outermost portion of the recessed portion and the bottom portion center of the recessed portion was 24 μm (30 times the dielectric layer thickness). In the result, a cross-sectional taper angle was 1 degree and a dielectric layer thickness of the recessed portion was 736 nm (at 92% of portion other than the recessed portion). The results showed that conforming items were obtained, having capacitance values of $2.5 \times 10^{-7}$ F or more and insulation resistance values of $5 \times 10^{+8} \Omega$ or more at 72% (72/100 pcs) of measured number of articles.

Example 16

The fabrication and the measurement were performed as with Example 1 except that the dielectric layer was subjected to laser processing with a power of 80 mJ and a spot diameter of 30 μm such that the shortest distance between the outermost portion of the recessed portion and the bottom portion center of the recessed portion was 20 μm (25 times the dielectric layer thickness). In the result, a cross-sectional taper angle was 1 degree and a dielectric layer thickness of the recessed portion was 760 nm (at 95% of portion other than the recessed portion). The results showed that conforming items were obtained, having capacitance values of $2.5 \times 10^{-7}$ F or more and insulation resistance values of $5 \times 10^{+8} \Omega$ or more at 66% (66/100 pcs) of measured number of articles.

Comparative Example 1

The fabrication and the measurement were performed as with Example 1 except that the dielectric layer was subjected to laser processing with a power of 50 mJ and a spot diameter of 20 μm such that the shortest distance between the outermost portion of the recessed portion and the bottom portion center of the recessed portion was 12 μm (15 times the dielectric layer thickness). In the result, a cross-sectional taper angle was 0.5 degree and a dielectric layer thickness was the recessed portion of 776 nm (at 97% of portion other than the recessed portion). The results showed that conforming items were obtained, having capacitance values of $2.5 \times 10^{-7}$ F or more and insulation resistance values of $5 \times 10^{+8} \Omega$ or more at 8% (8/100 pcs) of measured number of articles. As the cause of this, it can be considered that the recessed portion was such small and shallow that electric charge excessively flowed in the planar direction thereof.

Comparative Example 2

The fabrication and the measurement were performed as with Example 1 except that the dielectric layer was subjected to laser processing with a power of 900 mJ and a spot diameter of 250 μm such that the shortest distance between the outermost portion of the recessed portion and the bottom portion center of the recessed portion was 144 μm (180 times the dielectric layer thickness). In the result, a cross-sectional taper angle was 27 degrees and a dielectric layer thickness of the recessed portion was 240 nm (at 30% of portion other than the recessed portion). The results showed that conforming items were obtained, having capacitance values of $2.5 \times 10^{-7}$ F or more and insulation resistance values of $5 \times 10^{+8} \Omega$ or more at 6% (6/100 pcs) of measured number of articles. As the cause of this, it can be considered that the recessed portion was such large and deep that electric charge flowed in the cross-sectional direction dielectric layer.

Comparative Example 3

The fabrication and the measurement were performed as with Example 1 except that the dielectric layer was subjected to laser processing with a power of 900 mJ and a spot diameter of 20 μm such that the shortest distance between the outermost portion of the recessed portion and the bottom portion center of the recessed portion was 12 μm (15 times the dielectric layer thickness). In the result, a cross-sectional taper angle was 27 degrees and a dielectric layer thickness of the recessed portion was 360 nm (at 45% of portion other than the recessed portion). The results showed that conforming items were obtained, having capacitance values of $2.5 \times 10^{-7}$ F or more and insulation resistance values of $5 \times 10^{+8} \Omega$ or more at 6% (6/100 pcs) of measured number of articles. As the cause of this, it can be considered that the recessed portion was such deep that electric charge flowed in the cross-sectional direction of the dielectric layer.

Comparative Example 4

The fabrication and the measurement were performed as with Example 1 except that the dielectric layer was subjected to laser processing with a power of 50 mJ and a spot diameter of 250 μm such that the shortest distance between the outermost portion of the recessed portion and the bottom portion center of the recessed portion was 144 μm (180 times the dielectric layer thickness). In the result, a cross-sectional taper angle was 0.5 degree and a dielectric layer thickness of the recessed portion was 752 nm (at 94% of portion other than the recessed portion). The results showed that conforming items were obtained, having capacitance values of $2.5 \times 10^{-7}$ F or more and insulation resistance values of $5 \times 10^{+8} \Omega$ or more at 6% (6/100 pcs) of measured number of articles. As the cause of this, it can be considered that the recessed portion was such large and shallow that electric charge excessively flowed in the planar direction thereof.

The above-described series of examples and comparative examples will be summarized in Table 1.

TABLE 1

| | CONDITION | | FORM | | DIELECTRIC LAYER THICKNESS RATIO OF RECESSED PORTION TO NORMAL PORTION | SHORT-CIRCUIT CONFORMING ITEM RATE |
|---|---|---|---|---|---|---|
| | POWER OF LASER (mJ) | SPOT DIAMETER OF LASER (μm) | RATIO OF [DISTANCE BETWEEN OUTERMOST PORTION OF RECESSED PORTION AND BOTTOM PORTION CENTER]/ [DIELECTRIC LAYER THICKNESS OUTSIDE RECESSED PORTION] | TAPER ANGLE | | |
| EXAMPLE 1 | 800 | 30 | X22 | 18 DEG. | 80% | 91/100 pcs |
| EXAMPLE 2 | 700 | 50 | X40 | 18 DEG. | 73% | 93/100 pcs |
| EXAMPLE 3 | 700 | 100 | X70 | 18 DEG. | 68% | 97/100 pcs |
| EXAMPLE 4 | 700 | 130 | X100 | 18 DEG. | 65% | 99/100 pcs |
| EXAMPLE 5 | 700 | 150 | X130 | 18 DEG. | 60% | 98/100 pcs |
| EXAMPLE 6 | 400 | 200 | X150 | 10 DEG. | 64% | 94/100 pcs |
| EXAMPLE 7 | 100 | 200 | X150 | 2 DEG. | 85% | 90/100 pcs |
| EXAMPLE 8 | 300 | 100 | X80 | 12 DEG. | 60% | 93/100 pcs |
| EXAMPLE 9 | 250 | 100 | X80 | 7 DEG. | 77% | 85/100 pcs |
| EXAMPLE 10 | 100 | 100 | X80 | 3 DEG. | 90% | 83/100 pcs |
| EXAMPLE 11 | 400 | 30 | X25 | 10 DEG. | 60% | 81/100 pcs |
| EXAMPLE 12 | 100 | 30 | X25 | 4 DEG. | 90% | 80/100 pcs |
| EXAMPLE 13 | 600 | 200 | X150 | 15 DEG. | 50% | 71/100 pcs |
| EXAMPLE 14 | 700 | 200 | X150 | 18 DEG. | 45% | 68/100 pcs |
| EXAMPLE 15 | 80 | 40 | X30 | 1 DEG. | 92% | 72/100 pcs |
| EXAMPLE 16 | 80 | 30 | X25 | 1 DEG. | 95% | 66/100 pcs |
| COMPARATIVE EXAMPLE 1 | 50 | 20 | X15 | 0.5 DEG. | 97% | 8/100 pcs |
| COMPARATIVE EXAMPLE 2 | 900 | 250 | X180 | 27 DEG. | 30% | 6/100 pcs |
| COMPARATIVE EXAMPLE 3 | 900 | 20 | X15 | 27 DEG. | 45% | 6/100 pcs |
| COMPARATIVE EXAMPLE 4 | 50 | 250 | X180 | 0.5 DEG. | 94% | 6/100 pcs |

What is claimed is:

1. A thin film capacitor including a lower electrode layer, a dielectric layer provided on the lower electrode layer, and an upper electrode layer formed on the dielectric layer, wherein
the dielectric layer includes a recessed portion in a portion on an upper face thereof,
a cross-sectional structure perpendicular to the dielectric layer of the recessed portion has a cross-sectional taper angle of 1 to 25 degrees, the cross-sectional taper angle being formed by (1) a tangential line that is tangent to a position on an end portion of the recessed portion and at 50% of a maximum depth of the recessed portion, and (2) a line being an interface between a portion other than the recessed portion of the dielectric layer and the upper electrode layer, and
a distance between a bottom portion center and an outermost portion of the recessed portion is 20 to 150 times a thickness of the dielectric layer.

2. The thin film capacitor according to claim 1, wherein a thickness of a location where the dielectric layer is the thinnest in the recessed portion is 60% to 90% of a thickness of the dielectric layer other than the recessed portion.

* * * * *